(12) United States Patent
Lee

(10) Patent No.: US 10,236,516 B2
(45) Date of Patent: Mar. 19, 2019

(54) RESERVE BATTERY HAVING GOOD LOW TEMPERATURE PROPERTY

(71) Applicant: SEJU ENGINEERING CO., LTD, Daejeon (KR)

(72) Inventor: Won-Bae Lee, Daejeon (KR)

(73) Assignee: SEJU ENGINEERING CO., LTD., Daejeon (KR)

(*) Notice: Subject to any disclaimer, the term of this patent is extended or adjusted under 35 U.S.C. 154(b) by 978 days.

(21) Appl. No.: 14/357,094

(22) PCT Filed: Nov. 15, 2012

(86) PCT No.: PCT/KR2012/009657
§ 371 (c)(1),
(2) Date: May 8, 2014

(87) PCT Pub. No.: WO2014/042313
PCT Pub. Date: Mar. 20, 2014

(65) Prior Publication Data
US 2014/0315062 A1    Oct. 23, 2014

(30) Foreign Application Priority Data
Sep. 14, 2012 (KR) .......... 10-2012-0102120

(51) Int. Cl.
*H01M 6/38* (2006.01)
*H01M 6/32* (2006.01)
(Continued)

(52) U.S. Cl.
CPC .............. *H01M 6/38* (2013.01); *H01M 2/36* (2013.01)

(58) Field of Classification Search
None
See application file for complete search history.

(56) References Cited

U.S. PATENT DOCUMENTS 2,368,697 A * 2/1945 Winckler ............... H01M 6/38
429/116
2,852,592 A * 9/1958 Salauze ............... H01M 2/362
429/116
(Continued)

FOREIGN PATENT DOCUMENTS

KR    10-0758241 B1    9/2007
KR    10-0870040 B1    11/2008
(Continued)

*Primary Examiner* — Ula C Ruddock
*Assistant Examiner* — Anna Korovina
(74) *Attorney, Agent, or Firm* — Rabin & Berdo, P.C.

(57) ABSTRACT

There is provided a reserve battery activated by shock application of hitting means and having good operational feature at low temperature, comprising: a frame forming exterior case; an ampoule disposed inside the frame, containing an electrolyte solution and formed of membrane at the portion where the hitting means applies hitting; two electrodes disposed above the ampoule and formed with two laminated '−' and '+' layers, a cathode layer and an anode layer, each of the layers having a hole at its center portion; a separator disposed between the two electrodes and including a center separator in the middle of the separator formed such that except for one side of the center separator, the other side of the center separator is cut, wherein the other side of the center separator comes into the ampoule by the hitting of a hitting means, and contacts with the electrolyte solution contained inside the ampoule so that the electrolyte solution is absorbed into the center separator being in contact with the electrolyte solution, and transferred to the two electrodes so as to activate the reserve battery.

3 Claims, 4 Drawing Sheets

(51) Int. Cl.
*H01M 6/36* (2006.01)
*H01M 2/36* (2006.01)

(56) References Cited

U.S. PATENT DOCUMENTS

| | | | | |
|---|---|---|---|---|
| 2,855,451 A | * | 10/1958 | Piroux | H01M 10/34 |
| | | | | 205/57 |
| 2,935,547 A | * | 5/1960 | Kordesch | H01M 6/38 |
| | | | | 429/116 |
| 3,100,164 A | * | 8/1963 | Solomon | H01M 2/362 |
| | | | | 429/116 |
| 3,464,863 A | * | 9/1969 | Barron | H01M 6/38 |
| | | | | 429/114 |
| 4,150,198 A | * | 4/1979 | Domeniconi | H01M 6/38 |
| | | | | 429/116 |

FOREIGN PATENT DOCUMENTS

| KR | 10-2011-0017636 A | 2/2011 |
|---|---|---|
| KR | 10-2011-0026255 A | 3/2011 |
| KR | 10-2012-0022331 A | 3/2012 |

* cited by examiner

RESERVE BATTERY HAVING GOOD LOW TEMPERATURE PROPERTY

TECHNICAL FIELD

The present invention relates to a reserve battery having good low temperature property, and more particularly, to a reserve battery having good low temperature property in that an incision is made in the middle of a separator by cutting a portion of the separator except for one side, the incised portion only of the separator is in contact with an electrolyte solution, the contacted electrolyte solution is absorbed into the separator, and the electrolyte solution absorbed into the separator is transferred to electrodes and activated.

BACKGROUND ART

Generally, a battery is composed of cathode/anode active materials, electrolyte solution being chemically reacted with such active materials and generating electric energy, and so on. Unlike primary/secondary battery in which electrolyte solution is in contact with cathode/anode active materials, reserve battery is used in the way that electrolyte solution is normally stored in a sealed container, the container is mechanically broken by the application of shock when necessary to use electric energy so that the electrolyte solution reacts with active material and the battery starts its function. Such reserve batteries can be stored for long time because the electrolyte solution is completely separated from the active material and interior leakage current does not exist in the reserve battery unlike usual batteries. The reserve battery also has an advantage of no voltage delay because the active material and the electrolyte solution are in the very clean state when come to use at first start. With reasons as above, reserve battery is used as battery for emergency use or important energy source requiring long-time reserve period, which occupies large part in battery markets.

In conventional reserve batteries, glass ampoule is used to contain electrolyte solution or small container employs metal ampoule and in order to easily break the ample when in use, the broken portion in the ampoule is composed of membrane which is made of glass, silicon, or metal, etc. The conventional reserve battery structured as above is well operated at ordinary room temperature, but the battery is not activated at low temperature because the viscosity of electrolyte solution is increased at low temperature and so, the electrolyte solution is not transferred out of the ampoule.

DISCLOSURE

Technical Problem

Therefore, the present invention has been made to solve the above problems, and it is an aspect of the present invention to provide a reserve battery having good low temperature property in that an incision is made in the middle of a separator, which is disposed between two electrodes, by cutting a portion of the separator so that one side of the incision portion is uncut, the other side in the incision portion of the separator is in contact with an electrolyte solution when shock is applied by a hitting means, the contacted electrolyte solution is absorbed into the separator, and the electrolyte solution absorbed into the separator is transferred to electrodes even at low temperature and activated.

Further, the present invention is to provide a reserve battery having good low temperature property in that a groove is formed on the top surface of an ampoule containing electrolyte solution, and the top surface of the ampoule applies pressure inside the ampoule when shock is applied on a separator by a hitting means so that electrolyte solution is released out of the ampoule and the electrodes are activated.

Further, the present invention is to provide a reserve battery having good low temperature property in that a weight is formed on top or bottom of the ampoule top surface so that electrolyte solution is released out of the ampoule by setback force when a hitting means is not used and the battery is activated.

Technical Solution

In accordance with the present invention, the above and other aspects can be accomplished by a reserve battery activated by shock application of hitting means comprising: a frame forming exterior case; an ampoule disposed inside the frame, containing an electrolyte solution and formed of membrane at the portion where the hitting means applies hitting; two electrodes disposed above the ampoule and formed with two laminated '−' and '+' layers, a cathode layer and an anode layer, each of the layers having a hole at its center portion; a separator disposed between the two electrodes and including a center separator in the middle of the separator formed such that except for one side of the center separator, the other side of the center separator is cut, wherein the other side of the center separator comes into the ampoule by the hitting of a hitting means, and contacts with the electrolyte solution contained inside the ampoule so that the electrolyte solution is absorbed into the center separator being in contact with the electrolyte solution, and transferred to the two electrodes so as to activate the reserve battery.

Advantageous Effects

As described above, in accordance with the present invention, a reserve battery having good low temperature property is provided, in that an incision is made in the middle of a separator, which is disposed between two electrodes, by cutting a portion of the separator so that one side of the incision portion is uncut, while the other side of the incision portion in the separator is cut and the incision portion at the other side comes into and is in contact with an electrolyte solution when shock is applied by a hitting means, the electrolyte solution absorbed into the separator is transferred to electrodes even at low temperature and activated.

Further, a reserve battery having good low temperature property according to the present invention provides advantages in that a groove is formed on the top surface of an ampoule containing electrolyte solution, and the top surface of the ampoule applies pressure inside the ampoule when shock is applied on a separator by a hitting means so that electrolyte solution is released out of the ampoule and the electrodes are activated.

Further, a reserve battery having good low temperature property according to the present invention provides advantages in that a weight is formed on top or bottom of the ampoule top surface so that electrolyte solution is released out of the ampoule by setback force when a hitting means is not used and the battery is activated.

DESCRIPTION OF DRAWINGS

These and other aspects and advantages of the present invention will become apparent and more readily appreciated from the following description of the embodiments, taken in conjunction with the accompanying drawings, in which.

BRIEF DESCRIPTION OF REFERENCE NUMBERS OF MAJOR ELEMENTS

Figure 1:
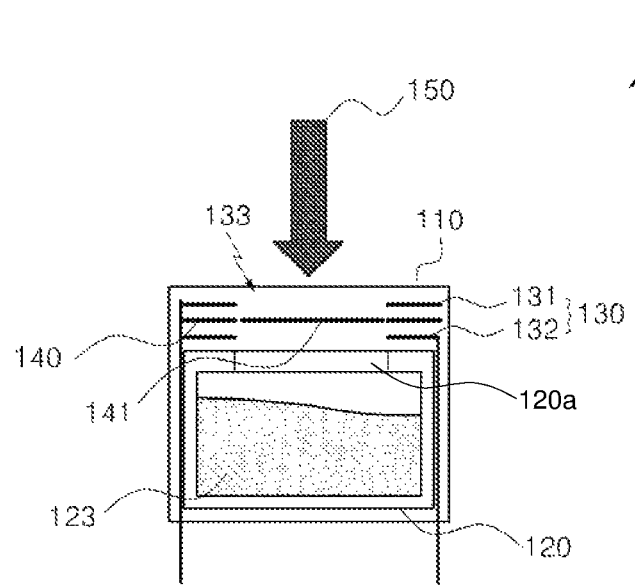
FIG. 1 is a sectional view of a reserve battery according to one embodiment of the present invention showing the inactivated state.

| | |
|---|---|
| 100: reserve battery | 110: frame |
| 120: ampoule | 121: pusher layer |
| 121a: groove | 122: weight |
| 123: electrolyte solution | 130: two electrodes |
| 131: cathode layer | 132: anode layer |
| 133: groove | 140: separator |
| 141: center separator | 150: hitting means |

Best Mode

The present invention to achieve the above aspects has the characteristics as follows:

In accordance with an embodiment of the present invention, there is a reserve battery activated by shock application of hitting means and having good operational feature at low temperature, the reserve battery comprising: a frame (110) forming exterior case; an ampoule (120) disposed inside the frame (110), containing an electrolyte solution (123) and formed of membrane at the portion where the hitting means applies hitting; two electrodes (130) disposed above the ampoule (120) and formed with two laminated '−' and '+' layers, a cathode layer (131) and an anode layer (132), each of the layers having a hole (133) at its center portion; a separator (140) disposed between the two electrodes (130) and including a center separator (141) in the middle of the separator (140) formed such that except for one side of the center separator (141), the other side of the center separator (141) is cut, wherein the other side of the center separator (141) comes into the ampoule (120) by the hitting of a hitting means (150), and contacts with the electrolyte solution (123) contained inside the ampoule (120) so that the electrolyte solution (123) is absorbed into the center separator (141) being in contact with the electrolyte solution (123), and transferred to the two electrodes (130) so as to activate the reserve battery (100).

Mode for Invention

The present invention will now be described more fully hereinafter with reference to the accompanying drawings, in which preferred embodiments of the invention are shown.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As used herein, the singular forms "a", "an" and "the" are intended to include the plural forms as well, unless the context clearly indicates otherwise.

The present invention may be embodied in different forms and should not be construed as limited to the embodiments set forth herein. Rather, these embodiments are provided as teaching examples of the invention. Therefore, it will be understood that the scope of the invention is intended to include various modifications and alternative arrangements within the capabilities of persons skilled in the art using presently known or future technologies and equivalents.

Further, an electrolyte solution injection hole and an injection hole sealer may be formed on the top of the ampoule (120) containing the electrolyte solution (123) as described in the prior arts by the applicant of the present invention, but such elements are not within the scope of the present invention, and they may be provided in the reserve battery of the present invention although they are not illustrated in the drawings or described in the detailed description of the present invention. In the same way, it should be considered that typical elements forming ordinary reserve batteries may be also provided even though they are no need to be illustrated or described in this specification of the present invention.

Figure 2:
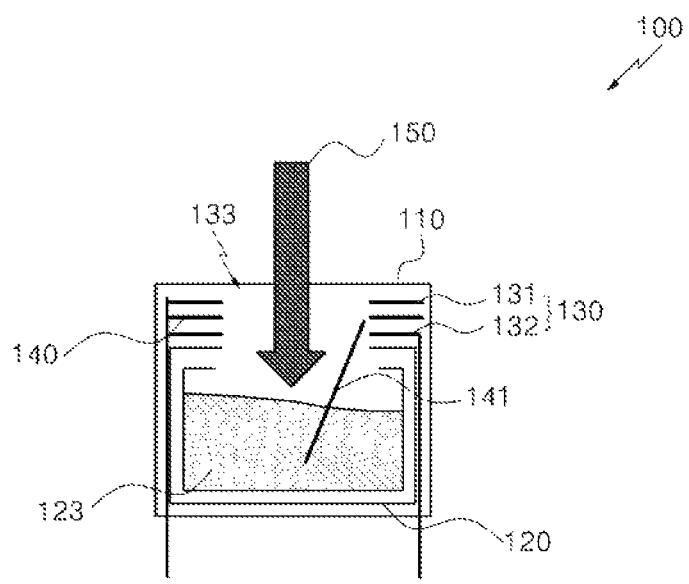
FIG. 2 is a view of the reserve battery of FIG. 1 showing the activated state.
Figure 3:
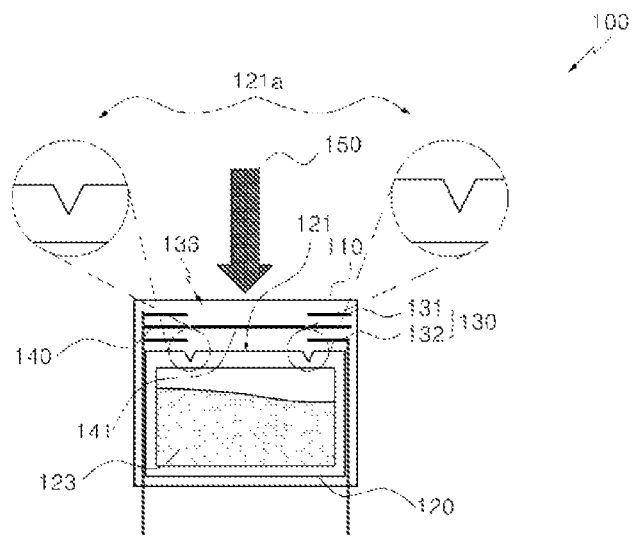
FIG. 3 is a sectional view of a reserve battery according to another embodiment of the present invention showing the inactivated state.
Figure 4:
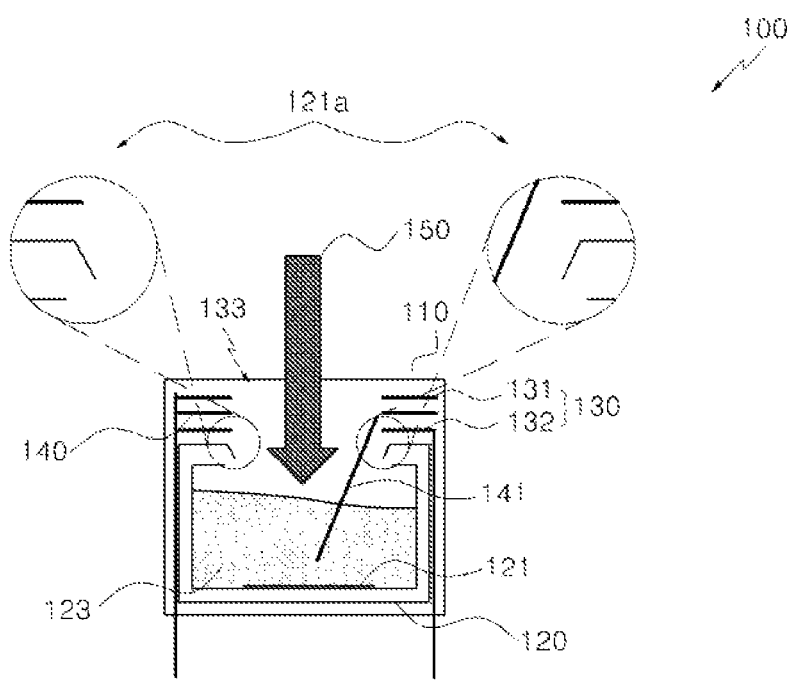
FIG. 4 is a view of the reserve battery of FIG. 3 showing the activated state.
Figure 5:
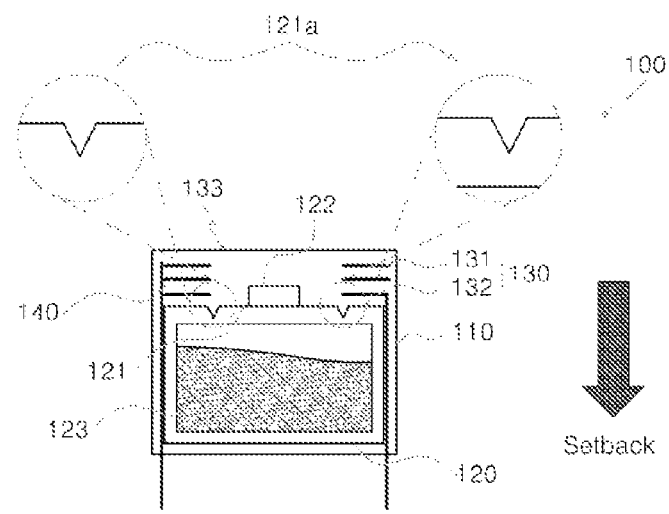
FIG. 5 is a sectional view of a reserve battery according to another embodiment of the present invention showing the inactivated state.
Figure 6:
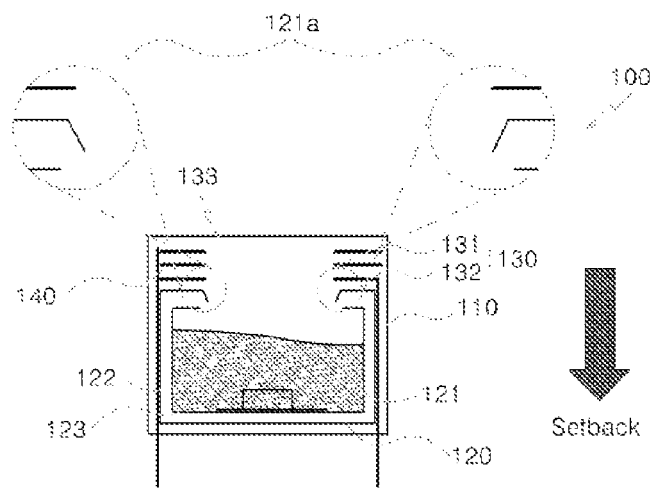
FIG. 6 is a view of the reserve battery of FIG. 5 showing the activated state.

FIG. 1 is a sectional view of a reserve battery according to one embodiment of the present invention showing the inactivated state, FIG. 2 is a view of the reserve battery of FIG. 1 showing the activated state, FIG. 3 is a sectional view of a reserve battery according to another embodiment of the present invention showing the inactivated state, FIG. 4 is a view of the reserve battery of FIG. 3 showing the activated state, FIG. 5 is a sectional view of a reserve battery according to another embodiment of the present invention showing the inactivated state, and FIG. 6 is a view of the reserve battery of FIG. 5 showing the activated state.

Hereinafter, referring to FIGS. 1 and 2, a reserve battery according to one embodiment of the present invention will be described, and a reserve battery according to another embodiment of the present invention will be described in reference to FIGS. 3 and 4. Referring to FIGS. 5 and 6, a reserve battery according to another embodiment of the present invention will be described.

A reserve battery (100) according to one embodiment of the present invention as illustrated in FIGS. 1 and 2, comprises a frame (110) forming exterior case, an ampoule (120), two electrodes (130), and a separator (140). The reserve battery (100) is activated by the shock of a hitting means (150).

The ampoule (120) is disposed inside the frame (110), and contains an electrolyte solution (123) thereinside. The ampoule (120) of includes a membrane (or a membrane member; 120a) at the top surface of the ampoule (120). The membrane has a diameter corresponding to a hole (133) formed in the two electrodes (130) to be described below, and is made to be easily broken when the shock is applied from the hitting means (150).

The two electrodes (130) are disposed above the ampoule (120) and formed with two laminated '−' and '+' layers, a cathode layer (131) and an anode layer (132). Each of the layers has a hole (133) at its center portion. The laminated order of the cathode layer (131) and the anode layer (132) can be changed. Further, the two electrodes (130) may be formed to further include a lead (not shown) which is connected out of the frame (110).

The separator (140) is disposed between the two electrodes (130) and includes a center separator (141) formed in the middle of the separator (140). The center separator (141) is formed such that its one side is uncut, but the other side is cut. In one embodiment of the present invention, the center separator (141) is formed in the middle of the separator (140) such that except for one side of the center separator (141), the other side of the center separator (141) is cut in the shape of 'C' or '⊏'. The other side the center separator (141) comes to contact with the electrolyte solution (123) contained inside the ampoule (120) when the hitting means (150) is applied.

In another embodiment of the present invention, the center separator (141) may be formed in the middle of the separator (140) by perforating in the shape of 'C' or '⊏' except for one side of the center separator (141). The other side of the center separator (141) may come to contact with the electrolyte solution (123) inside the ampoule (120) by the hit of the hitting means (150).

In the reserve battery (100) as structured above, the center separator (141) of the separator (140) hits the top surface of the ampoule (120) when the hit is applied on the reserve battery (100) by the hitting means (150), so that the separator (140) can come into the ampoule (120) and contact with the electrolyte solution (123). At this time, the electrolyte solution (123) is absorbed into the separator (140) and transferred to the two electrodes (130) so that the reserve battery (100) is activated.

Referring to FIGS. 3 and 4 according to another embodiment of the present invention, the ampoule (120) is formed to include a pusher layer (121) in the middle of the top surface, with a diameter corresponding to the holes (133) formed in the two electrodes (130), and a groove (121a) along its circumference and protruded upwardly or downwardly from its top surface. The reserve battery (100) structured as above is activated such that the hitting means (150) hits the separator (140) and the pusher layer (121) of the ampoule (121), and the pusher layer (121) is broken along the line of the groove (121a) by the hitting application from the hitting means (150), and comes into the ampoule (120) so as to cause the pressure inside the ampoule (120). Thereby, the electrolyte solution (123) inside the ampoule (120) is released out of the ampoule (120) by the pressure from the pusher layer (121) and transferred to the two electrodes (130).

Referring to FIGS. 5 and 6 according to another embodiment of the present invention, the ampoule (120) comprises a pusher layer (121) in the middle of the top surface, with a diameter corresponding to the holes (133) formed in the two electrodes (130), and a groove (121a) along its circumference and protruded upwardly or downwardly from its top surface, and a weight (122) on the top of the pusher layer (121) with a diameter smaller than that of the pusher layer (121). The reserve battery (100) structured as above is activated such that when the hitting means (150) does not operate to hit the reserve battery (100), the pusher layer (121) can be pushed down by setback force and the pusher layer (121) can be broken along the line of its groove (121a) by the weight (122) and comes into the ampoule (120) so as to cause pressure. Thereby, the electrolyte solution (123) inside the ampoule (120) is released out of the ampoule (120) by the pressure caused by the pusher layer (121) and transferred to the two electrodes (130) so as to activate the reserve battery.

Figure 7:
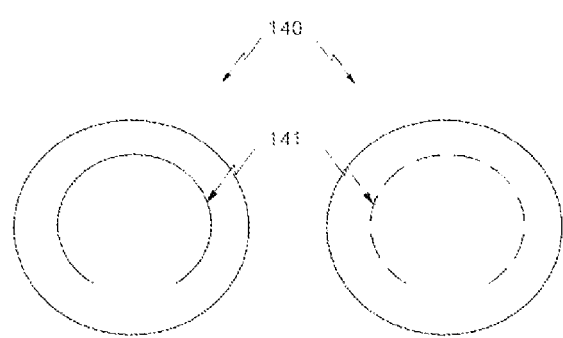
FIG. 7 is a view showing a separator of a reserve battery according to another embodiment of the present invention.

FIG. 7 is a view showing a separator of a reserve battery according to another embodiment of the present invention. Referring to FIG. 7, the separator of the reserve battery according to another embodiment of the present invention will be described.

Referring to FIG. 7, the center separator (141) is formed in the middle of the separator (140) such that except for one side of the center separator (141), the other side only of the center separator (141) may be cut or perforated. In such feature, when the hit is applied by the hitting means (150), the entire portion of the separator (140) does not come into the ampoule (120) while one part of the separator (140) is remained between the two electrodes (130). The other side of the center separator (141), which is cut or perforated, comes into the ampoule (120). The electrolyte solution (123) is absorbed into the center separator (141) through the other side of the center separator (141) and transferred to the two electrodes (130).

Therefore, by the structure and the method as described above, the reserve battery (100) can transfer the electrolyte solution (123) to the two electrodes (130) at low temperature regardless the normal condition that the viscosity of the electrolyte solution (123) increases or decreases according to temperature around, so as to provide the effect of activation at low temperature.

What is claimed is:

1. A reserve battery activated by shock application, the reserve battery comprising:
   a frame forming an exterior case;
   an ampoule disposed in a lower portion of an inside of the frame and configured to contain an electrolyte solution, the ampoule including a membrane member in a center portion of a top side of the ampoule and being configured to be broken by a shock applied to the ampoule by a hitting member;
   two electrodes disposed in an upper portion of the inside of the frame and above the ampoule, one of the two electrodes being placed above the other one of the two electrodes, each of the electrodes having a hole in a center portion of the each of the electrodes; and
   a separator disposed between the two electrodes and including
      a center section disposed in a center portion of the separator and surrounded by incisions,
      wherein a first portion of the center section is configured to be broken along the incisions by the shock and break through the membrane member of the ampoule such that the first portion contacts with the electrolyte solution contained inside the ampoule, and a second portion of the center section is configured to remain attached to the separator, whereby the electrolyte solution is absorbed into the separator through the first portion of the center section and transferred to the two electrodes so as to activate the reserve battery.

2. A reserve battery activated by shock application, the reserve battery comprising:
   a frame forming an exterior case;
   an ampoule disposed in a lower portion of an inside of the frame and configured to contain an electrolyte solution, the ampoule including a push layer in a center portion of the top side of the ampoule and being configured to be broken by a shock applied to the ampoule by a hitting member, wherein the push layer has a diameter corresponding to a hole formed in the two electrodes and has a groove formed along a circumference of the pusher layer such that the push layer is easily detached from the top side of the ampoule by the shock;

two electrodes disposed in an upper portion of the inside of the frame and above the ampoule, one of the two electrodes being placed above the other one of the two electrodes, each of the electrodes having the hole in a center portion of the each of the electrodes; and a separator disposed between the two electrodes and including a center section disposed in a center portion of the separator and surrounded by incisions, wherein a first portion of the center section is configured to be broken along the incisions by the shock and break down the push layer of the ampoule such that the first portion contacts with the electrolyte solution contained inside the ampoule, and a second portion of the center section is configured to remain attached to the separator, whereby the electrolyte solution is absorbed into the separator through the first portion of the center section and transferred to the two electrodes so as to activate the reserve battery.

3. The reserve battery according to claim 1, wherein the incisions of the center section are arranged in a shape of 'C' or '⊏' along a circumference of the center section.

* * * * *